United States Patent
Rodriguez Bravo et al.

(10) Patent No.: US 11,042,624 B2
(45) Date of Patent: *Jun. 22, 2021

(54) WIRELESS INJECTION OF PASSWORDS

(71) Applicant: International Business Machines Corporation, Armonk, NY (US)

(72) Inventors: Cesar Augusto Rodriguez Bravo, San Rafael de Alajuela (CR); John R. Feezell, Pikeville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,906

(22) Filed: Mar. 3, 2020

(65) Prior Publication Data
US 2020/0201975 A1    Jun. 25, 2020

Related U.S. Application Data

(63) Continuation of application No. 15/826,821, filed on Nov. 30, 2017, now Pat. No. 10,762,188.

(51) Int. Cl.
*G06F 21/35* (2013.01)
*G06F 13/42* (2006.01)
(Continued)

(52) U.S. Cl.
CPC ............ *G06F 21/35* (2013.01); *G06F 13/385* (2013.01); *G06F 13/4282* (2013.01);
(Continued)

(58) Field of Classification Search
CPC .......... G06F 21/35; G06F 21/34; G06F 21/45; G06F 21/85; G06F 13/4282;
(Continued)

(56) References Cited

U.S. PATENT DOCUMENTS

| 7,907,542 B2 | 3/2011 | Smith |
| 8,090,945 B2 | 1/2012 | Singhal |

(Continued)

FOREIGN PATENT DOCUMENTS

| CN | 2667807 Y | 12/2004 |
| CN | 101150409 A | 3/2008 |

(Continued)

OTHER PUBLICATIONS

Boukayoua, Faysal et al.; "A Keyboard that Manages Your Passwords in Android"; <https://msec.be/secureapps/onderzoeksresultaten/secure_mobile_password_manger.pdf; pp. 1 & 2.

(Continued)

*Primary Examiner* — Abiy Getachew
(74) *Attorney, Agent, or Firm* — Kelli D. Morin

(57) ABSTRACT

The disclosure is directed to wirelessly injecting passwords from a password vault application on a mobile device into a computing device. A method according to embodiments includes: sending a password using a wireless protocol from a mobile computing device to a universal serial bus human interface device (USB HID device) coupled with a computing device; receiving the password at the USB HID device; and injecting, by the USB HID device, the password as a series of keystrokes into a password field on the computing device.

25 Claims, 4 Drawing Sheets

(51) Int. Cl.
*G06F 13/38* (2006.01)
*G06F 21/34* (2013.01)
*G06F 21/45* (2013.01)
*G06F 21/85* (2013.01)
*H04W 4/80* (2018.01)

(52) U.S. Cl.
CPC .............. *G06F 21/34* (2013.01); *G06F 21/45* (2013.01); *G06F 21/85* (2013.01); *G06F 2213/0042* (2013.01); *H04W 4/80* (2018.02)

(58) Field of Classification Search
CPC ........... G06F 13/385; G06F 2213/0042; G06F 21/32; G06F 21/44; G06F 9/4406; G06F 9/4411; G06F 9/4451; H04W 4/80; H04W 12/0608; H04W 12/06; H04W 12/003; H04L 63/083; H04L 2463/082; H04L 63/0853; H04L 63/0861; H04L 63/0876
See application file for complete search history.

(56) References Cited

U.S. PATENT DOCUMENTS

| | | | |
|---|---|---|---|
| 8,171,531 B2 | 5/2012 | Buer | |
| 8,213,908 B2* | 7/2012 | Sangster | H04W 12/003 455/412.1 |
| 8,245,292 B2 | 8/2012 | Buer | |
| 8,307,412 B2 | 11/2012 | Ozzie et al. | |
| 8,370,640 B2 | 2/2013 | Adams et al. | |
| 8,386,795 B2 | 2/2013 | Lu et al. | |
| 8,812,864 B2 | 8/2014 | Adams et al. | |
| 8,910,274 B2 | 12/2014 | Sanders | |
| 8,924,734 B2 | 12/2014 | Riell | |
| 9,374,369 B2 | 6/2016 | Mahaffey et al. | |
| 9,565,181 B2 | 2/2017 | Brown | |
| 9,729,520 B2 | 8/2017 | Barton et al. | |
| 2006/0105712 A1* | 5/2006 | Glass | G06F 21/35 455/41.2 |
| 2008/0148057 A1 | 6/2008 | Hauw | |
| 2009/0222908 A1 | 9/2009 | Warren | |
| 2013/0031623 A1 | 1/2013 | Sanders | |
| 2014/0298432 A1 | 10/2014 | Brown | |
| 2014/0380445 A1 | 12/2014 | Tunnell et al. | |
| 2016/0373420 A1 | 12/2016 | Dvorak | |
| 2017/0068814 A1 | 3/2017 | Childress et al. | |
| 2019/0163893 A1 | 5/2019 | Rodriguez Bravo et al. | |

FOREIGN PATENT DOCUMENTS

| | | |
|---|---|---|
| CN | 100576798 C | 12/2009 |
| CN | 106375304 A | 2/2017 |
| CN | 106452763 A | 2/2017 |
| WO | 2014145186 A1 | 9/2014 |

OTHER PUBLICATIONS

De Ru et al., "Enhanced Password Authentication Through Fuzzy Logic," IEEE Expert, Nov./Dec. 1997, pp. 38-45, © 1997 IEEE.
International Search Report and Written Opinion dated Mar. 4, 2019, for PCT/IB2018/059216 filed Nov. 22, 2018; 8 pgs.
List of IBM Patents or Patent Applications Treated as Related, Mar. 3, 2020, 2 pgs.
Park, John; "Password Vault"; <https://learn.adafruit.com/adabox007/password-vault; pp. 2 & 3, printed Apr. 24, 2018.
Unknown; "LastPass Password Manager"; LastPass Password Manager- Android Apps on Google Play; Printed Sep. 25, 2017; pp. 4; <http://play.google.com/store/apps/details?id=com.lastpass.ipandroid&hl=en>.
Vultur, Horatiu-Laurentiu; "Password Managers"; <http://projekter.aau.dk/projekter/files/239482329/Password_Manger.pd; May 2016; pp. 20 & 21.

* cited by examiner

WIRELESS INJECTION OF PASSWORDS

TECHNICAL FIELD

The present invention relates generally to computer security, and more particularly, to a method, system, and computer program product for the wireless injection of passwords from a password vault application on a mobile device to a computing device with a Universal Serial Bus (USB) port.

BACKGROUND

A password is a word or string of characters used for user authentication to prove identity or access authentication to gain access to a resource (e.g., a computer device). A password, although very vulnerable to hacking, is still the most common method for authentication. Recent studies have confirmed that the worst passwords are in fact the most commonly used. For example, the passwords "12345," "password," "qwerty," and "letmein" are some of the widely used passwords around the world.

Other authentication methods, such as fingerprint or facial recognition, have also been employed, but have proven to be less than 100% secure. Multi-factor authentication, as well as smart cards and other hardware-based authentication devices, have also been developed, but these solutions typically require proprietary software that makes them difficult and expensive to implement.

A password vault application assists in generating and retrieving complex passwords, potentially storing such passwords in an encrypted database, or calculating them on demand. Types of password vault applications may include, for example, locally installed software applications, online services accessed through website portals, or locally accessed hardware devices that serve as keys. Depending on the type of password manager used and on the functionality offered by its developers, the encrypted database is either stored locally on a user's device (e.g., mobile device or computer device) or stored remotely through an online file-hosting service. Password vault applications typically require a user to generate and remember one "master" password to unlock and access any information stored in their databases. Although use of password vault applications has generally decreased the hacking vulnerability of passwords, they cannot be used across all operating systems and hardware platforms.

SUMMARY

A first aspect of the invention provides a method for wirelessly injecting passwords, including: sending a password using a wireless protocol from a mobile computing device to a universal serial bus human interface device (USB HID device) coupled with a computing device; receiving the password at the USB HID device; and injecting, by the USB HID device, the password as a series of keystrokes into a password field on the computing device.

A second aspect of the invention provides a computerized system for wirelessly injecting passwords by performing a method, the method including: sending a password using a wireless protocol from a mobile computing device to a universal serial bus human interface device (USB HID device) coupled with a computing device; receiving the password at the USB HID device; and injecting, by the USB HID device, the password as a series of keystrokes into a password field on the computing device.

A third aspect of the invention provides a computer program product stored on a computer readable storage medium, which when executed by a computer system, performs a method for wirelessly injecting passwords, the method including: sending a password using a wireless protocol from a mobile computing device to a universal serial bus human interface device (USB HID device) coupled with a computing device; receiving the password at the USB HID device; and injecting, by the USB HID device, the password as a series of keystrokes into a password field on the computing device.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description taken in conjunction with the accompanying drawings that depict various aspects of the invention.

Figure 1:
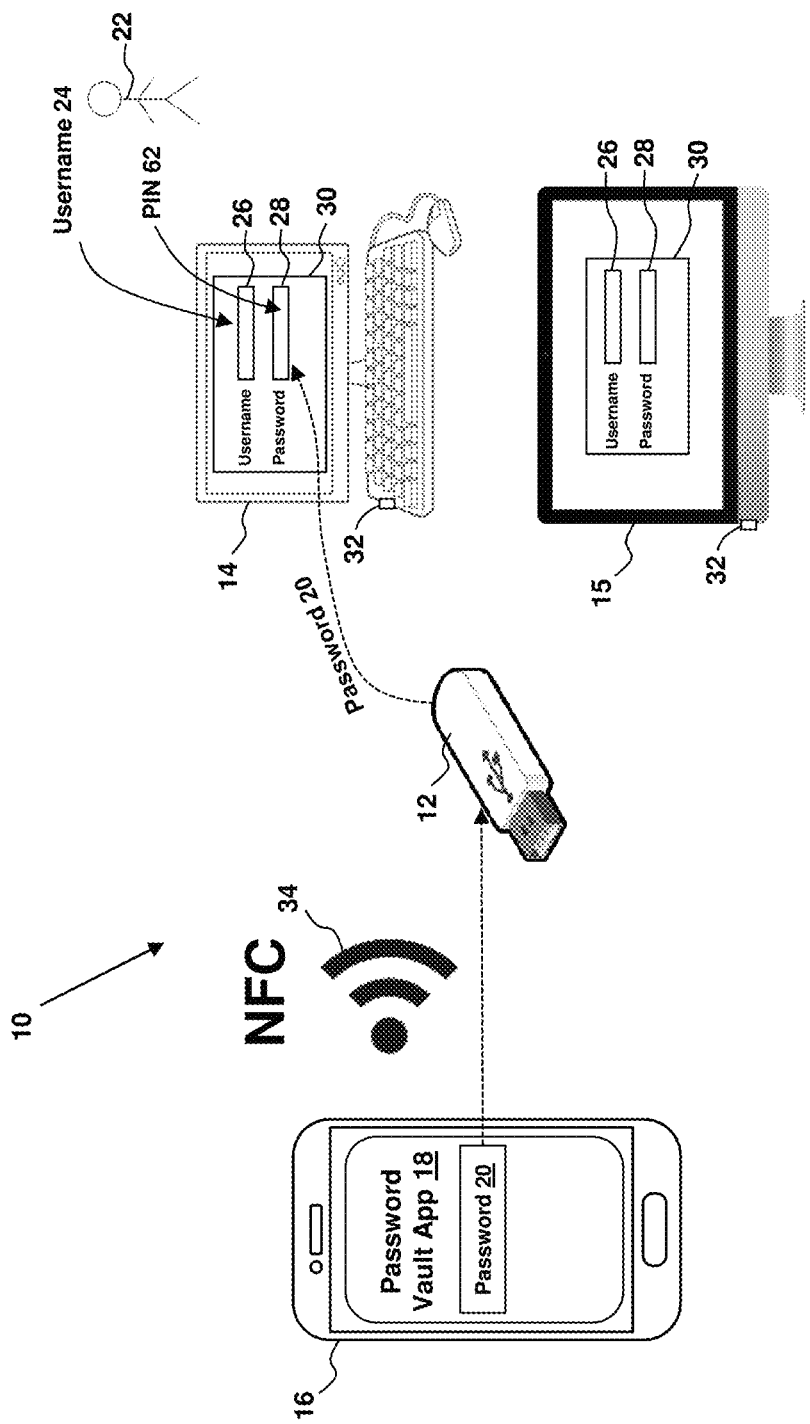
FIG. 1 depicts a system including a USB HID device for wirelessly injecting passwords according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The present invention relates generally to computer security, and more particularly, to a method, system, and computer program product for the wireless injection of passwords from a password vault application on a mobile device to a computing device with a USB port.

Universal serial bus (USB) is a communications architecture that gives a computing device the ability to easily interconnect a variety of devices through a USB port. USB protocols can configure devices at startup or when they are plugged in at run time. These devices are broken into various device classes. Each device class defines the common behavior and protocols for devices that serve similar functions. One examples of a USB device class is a human interface device (HID), which specifies a device class (a type of computer hardware) for human interface devices such as keyboards, mice, game controllers, and alphanumeric display devices. Most, if not all, computer operating systems include HID drivers capable of automatically recognizing USB HID devices.

According to embodiments, a USB device with HID capabilities (e.g., a USB keyboard) is provided for injecting passwords into a computing device with a USB port. The USB device with HID capabilities (or "USB HID device") may be a USB drive, also variously known as a thumb drive, pen drive, jump drive, disk key, disk on key, flash-drive, memory stick, USB memory and/or the like. A USB drive is a data storage device that includes memory (e.g., flash memory) with integrated USB interface. The USB HID device will be described in greater detail below.

A system 10 including a USB HID device 12 for wirelessly injecting passwords into one or more computing systems (14, 15 in FIG. 1) according to embodiments is depicted in FIG. 1. Generally, the system 10 includes a mobile computing device 16 and the USB HID device 12. The mobile computing device 16 may include, for example, any computing device that is small enough to hold and operate in the hand of a user, or which can be worn by the user. A non-limiting set of examples of mobile computing devices includes mobile phones (e.g., smartphones), tablets, laptop computers, mobile internet devices, and wearable computers including smartwatches and head-mounted displays.

The mobile computing device 16 includes a password vault application 18, which is used to securely manage, store, and retrieve passwords for logging onto one or more computer systems 14. The password vault application 18 may include any now known or later developed password vault application 18 capable of outputting a password 20 as described herein.

As depicted in FIG. 1, logging into a computer system 14, 15 typically involves a user 22 entering a username 24 and associated password 20 into corresponding username and password fields 26, 28 presented on a log in screen 30. According to embodiments, a USB HID device 12, when coupled to a computer system 14 (e.g., when inserted into a USB port 32 of the computer system 14) is provided for wirelessly injecting a password 20 into the password field 28 of the log in screen 30 on the computer system 14 as a series of keystrokes. The password 20 is transmitted from the password vault application 18 on the mobile computing device 16 to the USB HID device 12 using a wireless communication protocol 34 such as, for example, near-field communication (NFC), Bluetooth, infrared, ZigBee, WiFi, cellular, and/or the like. Any suitable now known or later developed wireless communication protocol 34 capable of transmitting data between a mobile computing device 16 and a USB HID device 12 (or more generally a USB device) may be used.

Figure 2:
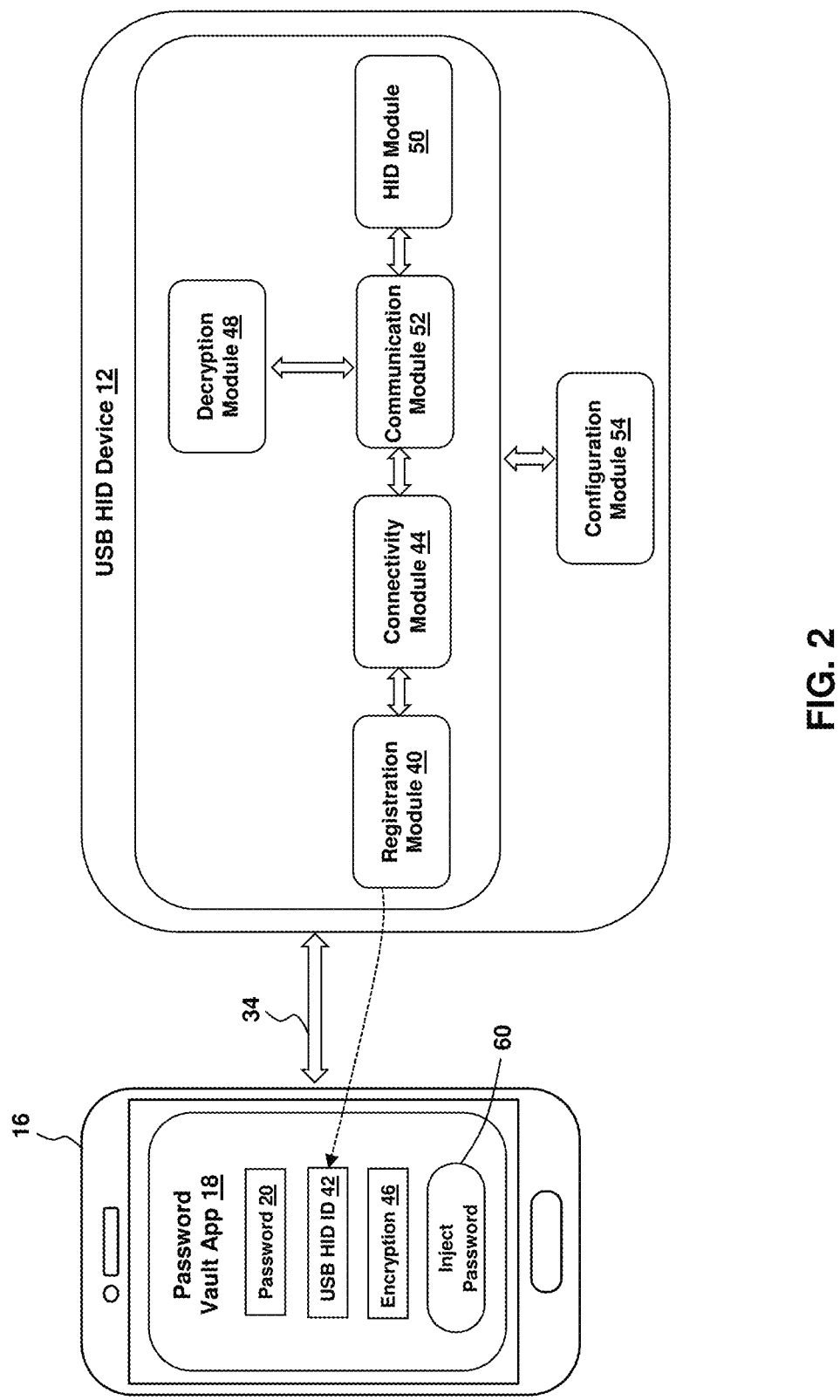
FIG. 2 depicts the USB HID device of FIG. 1 in greater detail according to embodiments.

FIG. 2 depicts the USB HID device 12 of FIG. 1 according to embodiments in greater detail.

The registration module 40 handles the registration (e.g., pairing) of the USB HID device 12 and a mobile computing device 16. This may include, for example, the registration module 40 providing a serial number or other identifier 42 of the USB HID device 12 to the password vault application 18 on the mobile computing device 16. Registration of the USB HID device 12 may be required before any communication of password data between the password vault application 18 on the mobile computing device and the USB HID device 12 is permitted.

The connectivity module 44 is in charge of communication between the password vault application 18 and the USB HID device 12. The communication module 44 is capable of transmitting data between the password vault application 18 and the USB HID device 12 using one or more wireless communication protocols 34.

The password vault application 18 stores at least one password 20 for use in logging into each of the computer systems 14 (e.g., one password for each user 22). A unique user and computer name combination may be used to index each of the passwords 20 in the password vault application 18. For example, with regard to the system 10 shown in FIG. 1, user 22 has a username "1XXXX1" and password "@BCDEFGH!" for logging into computer system 14, which has a computer name of "comp1" and includes a first operating system (OS). User 22 also has a username "1YYYY2" and password "JKLMNθP" for logging into computer system 15, which has a computer name of "comp2" and includes a second OS, different from the first OS. A different user (not shown) does not have access to computer system 14, but is allowed to sign on to computer system 15 using his/her own mobile computing device, password vault application, USB HID device, and username and password as described herein. Other indexing methodologies are also possible. To this extent, the password vault application 18 used by user 22 may index user 22's passwords as follows:
1XXXX1, comp1 @BCDEFGH!; and
1XXXX2, comp2 JKLMNθP!.

When logging into a computer system 14, user 22 enters username "1XXXX1" into the username field 26 of computer system 14 and inserts his/her USB HID device 12 into the USB port 32 on computer system 14. The insertion of the USB HID device 12 may occur before or after user 22 enters username "1XXXX1" into the username field 26 of computer system 14. User 22 selects the user/computer name combination of the computer system 14 (e.g., 1XXXX1, comp1) stored by the password vault application 18 on his/her mobile computing device 16. When instructed, the password vault application 18 transmits the password 20 (e.g., @BCDEFGH! in the above example) associated with the selected user/computer name combination to the USB HID device 12. The password vault application 18 may include an encryption module 46 for encrypting the password 20 at some point prior to transmission to the USB HID device 12. Any suitable encryption methodology may be used to encrypt the password 20.

After receipt of the password 20 at the USB HID device 12, the password 20 is decrypted (if necessary) by a decryption module 48 and is provided to an HID module 50. A communication module 52 controls the communication of data between the various modules in the USB HID device 12. A configuration module 54 is provided to handling the configuration of the USB HID device 12 (e.g., security, encryption, decryption, connectivity, registration, and/or the like).

The HID module 50 provides the USB HID device 12 with HID capabilities. According to embodiments, the HID module 50 is configured to emulate a generic (e.g., natively-supported) keyboard such that the USB HID device 12 appears as a generic USB keyboard to the computer system 14 when it is inserted into the USB port 32. The HID module 50 cooperates with a generic keyboard driver on the computer system 14. Such generic keyboard drivers are provided by almost all computer operating systems available today. To this extent, the USB HID device 12 will be recognized as a USB keyboard by almost any type of computer running almost any type of operating system. Returning to the above example, user 22 may remove the USB HID device 12 from the computer system 14 (first OS) and insert the USB HID device 12 into the USB port 32 of the computer system 15 (second OS). Advantageously, even though the computer system 15 uses a different OS than the computer system 14, the computer system 15 will still recognize the USB HID device 12 as a USB keyboard.

Referring again to FIG. 2, the password vault application 18 further includes an "Inject Password" button 60. After the USB HID device 12 has been inserted into the USB port 32 of a computer system 14, the user 22 actuates the Inject Password button 60, which causes the password 20 to be transmitted from the password vault 18 on the mobile computing device 16 to the USB HID device 12. Upon receipt of the password 20, the HID module 50 injects the password 20 into the password field 28 of the log in screen 30 on the computer system 14 as a series of keystrokes. With the username field 26 and password field 28 now filled in, the user 22 can securely log into the computer system 14.

An optional PIN 62 (e.g., a 4 digit numeric code) may be appended (e.g., manually) to the injected password 20 as depicted in FIG. 1. This would add an additional layer of security if the password 20 itself is intercepted or the password vault application 18 is somehow compromised. Without the PIN, the password 20 would not be usable, as the PIN would be, in effect, another "something you know" factor of authentication. The PIN 62 may, for example, be manually added by a user 22 to the end of the password 20 after the password 20 has been injected into the password field 28 of the log in screen 30.

Figure 3:
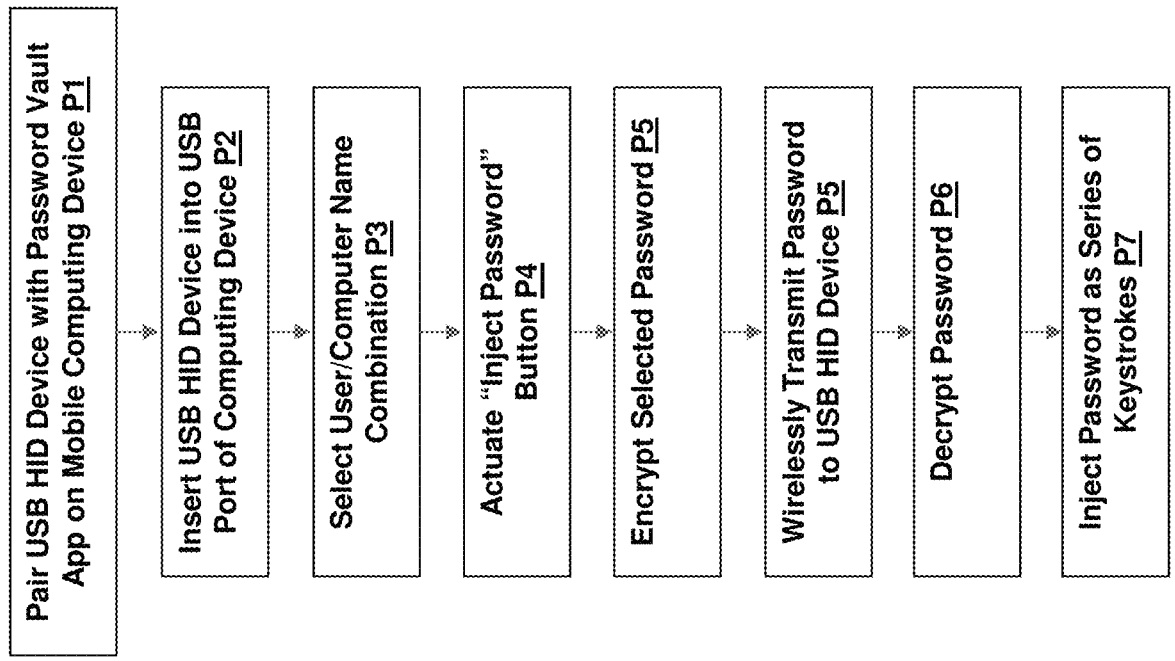
FIG. 3 depicts a process for wirelessly injecting passwords according to embodiments.

FIG. 3 depicts a process for wirelessly injecting passwords according to embodiments according to embodiments. At P1, a USB HID device is paired with a password vault application on a mobile computing device. At P2, the USB HID device is inserted into the USB port of a computing device. At P3, a user/computer name combination is selected. At P4, the "Inject Password" button is actuated. At P5, the password corresponding to the selected user/computer name is encrypted. At P6, the encrypted password is wirelessly transmitted to the USB HID device. At P7, the encrypted password is decrypted by the decryption module of the USB HID device. At P8, the HID module of the USB HID device injects the password as a series of keystrokes into the password field of a log on screen on the computer device.

According to embodiments, the USB HID device 12 can be used to wirelessly inject a password 20 from a password vault application 18 on a mobile computing device 16 to any computing device 14, 15 having a USB port 32. Complex passwords 20 stored in the password vault application can be easily wirelessly transferred to any computing device 14, 15 with a USB port 32, using native HID drivers. This provides a true plug and play solution, since no additional drivers are required, which can be used to log on to almost any operating system on almost any computing system. This solution provides increased security, since a mobile computing device 16 is paired to a specific USB HID device 12. By automatically injecting a password 20 as a series of keystrokes via a USB HID device 12, the risk of displaying a password in clear text (e.g., on a mobile computing device 16) is avoided. The risk of being locked out of a computing system by entering an incorrect password is eliminated, and the need to remember and manually enter a very complex password is avoided (one purpose of using a password vault application is to have complex passwords).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 4:
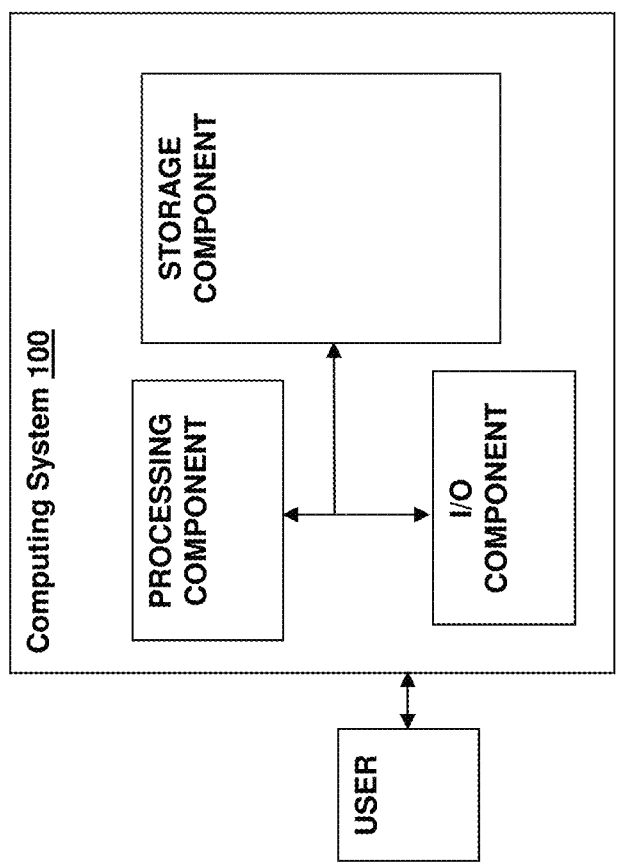
FIG. 4 depicts a processing system for wirelessly injecting passwords according to embodiments.

FIG. 4 depicts an illustrative processing system 100 (e.g., within a mobile device) for implementing various aspects of the present invention, according to embodiments. The processing system 100 may comprise any type of computing device and, and for example includes at least one processor, memory, an input/output (I/O) (e.g., one or more I/O interfaces and/or devices), and a communications pathway. In general, processor(s) execute program code, which is at least partially fixed in memory. While executing program code, processor(s) can process data, which can result in reading and/or writing transformed data from/to memory and/or I/O for further processing. The pathway provides a communications link between each of the components in processing system 100. I/O can comprise one or more human I/O devices, which enable a user to interact with processing system 100.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A method for wirelessly injecting a password, the method comprising:
   wirelessly transmitting a password from a mobile computing device to a human interface device (HID) that is coupled with a computing device such that the HID appears as a keyboard to the computing device, wherein the password is encrypted prior to sending the password from the mobile computing device to the HID;
   receiving the password at the HID; and
   injecting, via the HID, the password as a series of keystrokes into a password field of the computing device.

2. The method of claim 1, further comprising pairing the HID with the mobile computing device.

3. The method of claim 1, further comprising providing the password from a password vault application on the mobile computing device.

4. The method of claim 1, further comprising decrypting the password at the HID prior to injecting the password into the password field of the computing device.

5. The method of claim 1, further comprising appending a personal identification number to the series of keystrokes after the series of keystrokes have been injected into the password field of the computing device.

6. The method of claim 1, wherein:
   the computing device includes an operating system (OS) capable of identifying the HID as a keyboard; and
   the method is performed using the OS.

7. The method of claim 1, wherein the password is injected without disclosing the password.

8. A computerized system for wirelessly injecting a password by performing a method, the method comprising:
   wirelessly transmitting a password from a mobile computing device to a human interface device (HID) that is coupled with a computing device such that the HID appears as a keyboard to the computing device, wherein the password is provided from a password vault application on the computing device;
   receiving the password at the HID; and
   injecting, via the HID, the password as a series of keystrokes into a password field of the computing device.

9. The computerized system of claim 8, the method further comprising pairing the HID with the mobile computing device.

10. The computerized system of claim 8, the method further comprising encrypting the password prior to sending the password from the mobile computing device to the HID.

11. The computerized system of claim 10, the method further comprising decrypting the password at the HID prior to injecting the password into the password field of the computing device.

12. The computerized system of claim 8, the method further comprising appending a personal identification number to the series of keystrokes after the series of keystrokes have been injected into the password field of the computing device.

13. The computerized system of claim 8, wherein:
the computing device includes an operating system (OS) capable of identifying the HID as a keyboard; and
the method is performed using the OS.

14. The computerized system of claim 8, wherein the password is injected without disclosing the password.

15. A computer program product comprising a computer readable storage medium having program instructions embodied therewith, the program instructions being executable by a computer system to cause the computer system to perform a method for wirelessly injecting a password, the method comprising:
wirelessly transmitting a password from a mobile computing device to a human interface device (HID) that is coupled with a computing device such that the HID appears as a keyboard to the computing device;
receiving the password at the HID; and
injecting, via the HID, the password as a series of keystrokes into a password field of the computing device, wherein the password is injected without disclosing the password.

16. The computer program product of claim 15, the method further comprising providing the password from a password vault application on the mobile computing device.

17. The computer program product of claim 15, the method further comprising:
encrypting the password prior to sending the password from the mobile computing device to the HID; and
decrypting the password at the HID prior to injecting the password into the password field of the computing device.

18. The computer program product of claim 15, the method further comprising appending a personal identification number to the series of keystrokes after the series of keystrokes have been injected into the password field of the computing device.

19. A method for wirelessly injecting a password, the method comprising:
wirelessly transmitting a password from a mobile computing device to a human interface device (HID) that is coupled with a computing device such that the HID appears as a keyboard to the computing device, wherein the password is provided from a password vault application on the computing device;
receiving the password at the HID; and
injecting, via the HID, the password as a series of keystrokes into a password field of the computing device.

20. A method for wirelessly injecting a password, the method comprising:
wirelessly transmitting a password from a mobile computing device to a human interface device (HID) that is coupled with a computing device such that the HID appears as a keyboard to the computing device;
receiving the password at the HID; and
injecting, via the HID, the password as a series of keystrokes into a password field of the computing device, wherein the password is injected without disclosing the password.

21. The method of claim 20, further comprising pairing the HID with the mobile computing device.

22. The method of claim 20, further comprising providing the password from a password vault application on the mobile computing device.

23. The method of claim 20, further comprising encrypting the password prior to sending the password from the mobile computing device to the HID.

24. The method of claim 23, further comprising decrypting the password at the HID prior to injecting the password into the password field of the computing device.

25. The method of claim 20, further comprising appending a personal identification number to the series of keystrokes after the series of keystrokes have been injected into the password field of the computing device.

* * * * *